United States Patent [19]
Savage et al.

[11] Patent Number: 6,095,037
[45] Date of Patent: Aug. 1, 2000

[54] HIGH EFFICIENT CONVECTION FRYER WITH CONTINUOUS FILTRATION

[75] Inventors: Steven J. Savage, Concord; Thomas DeWayne Wendel, Nashua, both of N.H.

[73] Assignee: Pitco Frialator, Inc., Concord, N.H.

[21] Appl. No.: 08/724,233

[22] Filed: Sep. 27, 1996

[51] Int. Cl.[7] .............................. A47J 37/00; A47J 37/12
[52] U.S. Cl. .............................. 99/408; 99/330; 99/403; 210/167; 210/DIG. 8
[58] Field of Search ..................... 99/330–336, 403–418, 99/483, 484; 126/391, 383, 374; 210/167, DIG. 8; 219/441, 442, 439, 483, 486, 492, 494, 497, 501; 426/233, 438; 137/341, 558

[56] References Cited

U.S. PATENT DOCUMENTS

| | | |
|---|---|---|
| 3,977,973 | 8/1976 | Anderson . |
| 4,050,447 | 9/1977 | Terracciano ............................ 99/330 X |
| 4,135,079 | 1/1979 | McGraw .............................. 137/558 X |
| 4,210,123 | 7/1980 | Moore et al. ......................... 137/563 X |
| 4,282,094 | 8/1981 | Mitchell .............................. 210/167 X |
| 4,485,831 | 12/1984 | Ungerleider ......................... 137/341 X |
| 4,599,990 | 7/1986 | Fritzsche et al. ...................... 99/403 X |
| 4,622,135 | 11/1986 | Williams .............................. 137/341 X |
| 4,623,544 | 11/1986 | Highnote . |
| 4,646,793 | 3/1987 | Sherratt ...................................... 99/403 |
| 4,768,426 | 9/1988 | Nett . |
| 4,962,698 | 10/1990 | Drijftholt et al. . |
| 5,179,891 | 1/1993 | Chiu ........................................... 99/408 |
| 5,249,511 | 10/1993 | Shumate et al. .......................... 99/408 |
| 5,315,921 | 5/1994 | Davis ........................................ 99/330 |
| 5,404,799 | 4/1995 | Bivens . |
| 5,609,193 | 3/1997 | Steckler ................................. 141/82 X |
| 5,629,039 | 5/1997 | Brintle ................................... 426/417 |

*Primary Examiner*—Timothy Simone
*Attorney, Agent, or Firm*—Donald C. Casey, Esq.

[57] ABSTRACT

An improved efficient deep fat fryer is described. Heat exchange within the fryer tank is facilitated by a "U" shaped burner tube which is cantilever mounted from a side of the tank and a burner system is provided to circulate in a spiral pathway products of combustion through the burner tube. An internal turbulator baffle is provided to both facilitate the spiral circulation through the tube and to facilitate heat transfer from the combustion gases to burner tube walls. Exhaust gases are circulated downwardly from the burner tubes to a plenum beneath the tank which also has heat transfer baffle plates to facilitate heat exchange. Ultimately the products are expelled through a flue. The system further comprises filter bags for continuously filtering the oil which are disposed in a sump at the surface of the oil so that oil continually spills from the tank into the sump where it is filtered preferably by one or more bags of cloth material. Other types of filters could be used such as metal or paper or a synthetic in combination with paper so long as porosity is maintained and a filter powder could be used. The system provides a pump for recirculating the filtered oil to the tank.

18 Claims, 5 Drawing Sheets

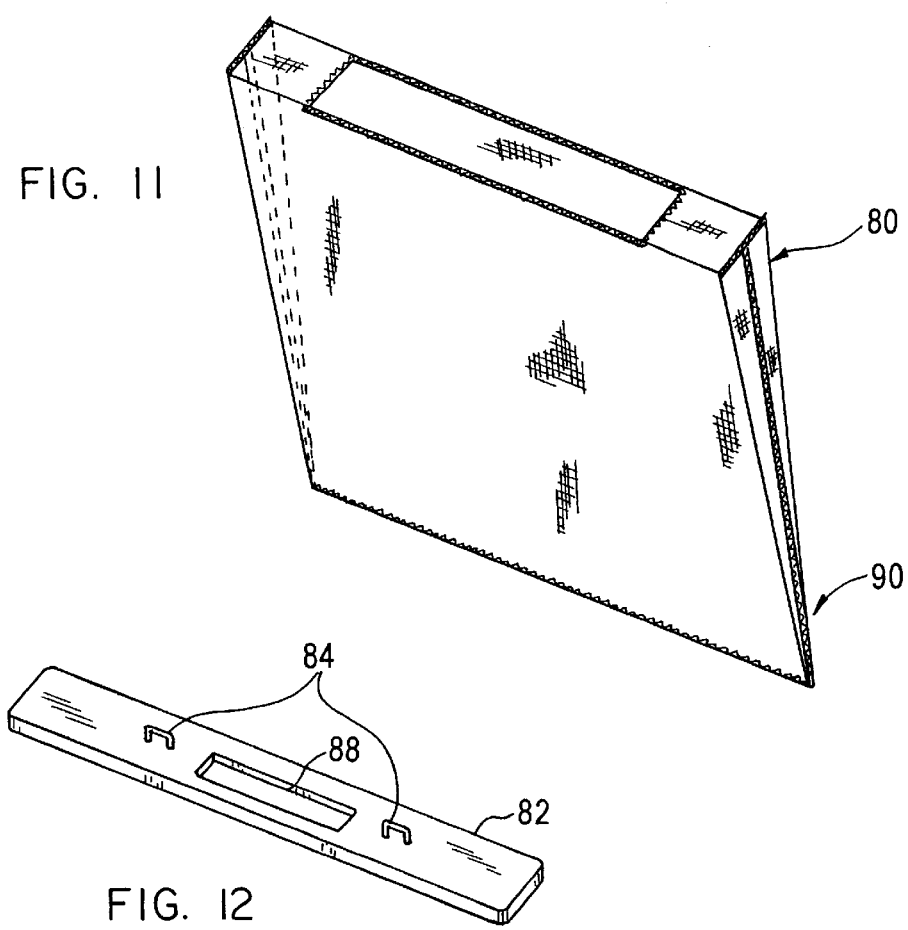
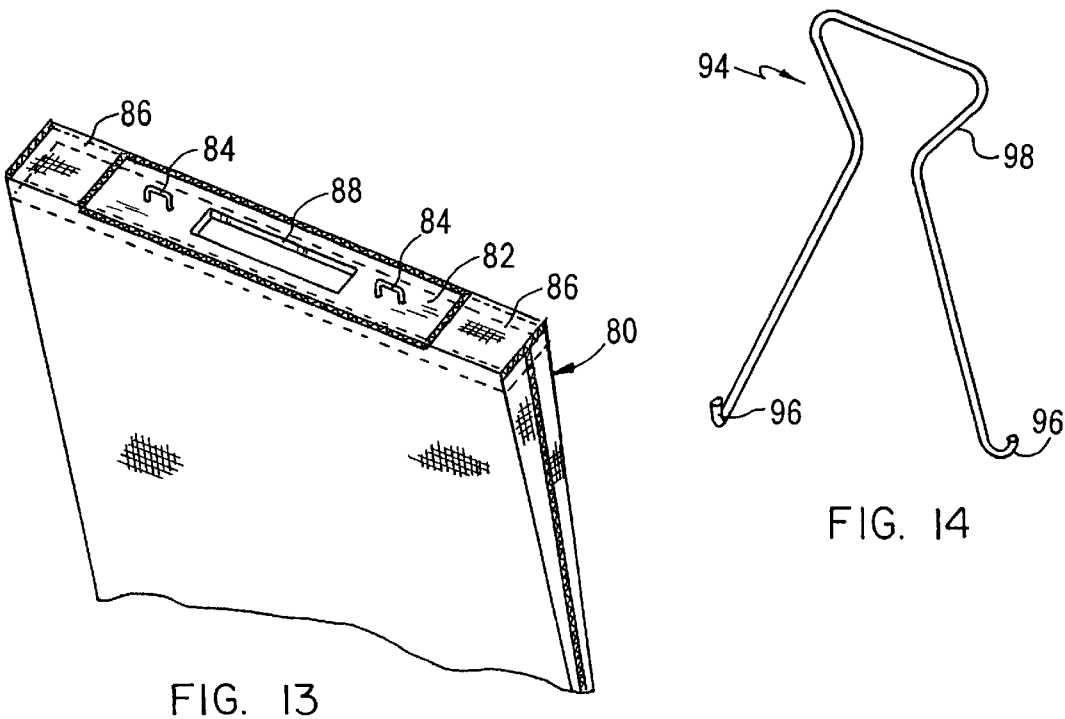

HIGH EFFICIENT CONVECTION FRYER WITH CONTINUOUS FILTRATION

CROSS REFERENCE TO RELATED APPLICATIONS

This application is related to U.S. patent applications Ser. Nos. 08/626,318 now U.S. Pat. No. 5,577,438 and 08/626,319, now U.S. Pat. No. 5,582,093 filed Apr. 2, 1996, and assigned to the Assignee of this invention.

FIELD OF THE INVENTION

This invention relates to deep fat fryers and in particular to deep fat fryers in which the oil used for cooking is filtered on a continuous basis so that food particles in the cooking oil are quickly removed to minimize their effect upon the taste of the food being cooked. The oil removed from the cooking bath is filtered and returned to the heated bath on a continuous basis.

DESCRIPTION OF THE PRIOR ART

Commercial deep fat fryers typically are heated by heat tubes extending through the oil bath so that food being cooked is disposed above the heat tubes and dislodged particles from the food during cooking are allowed to settle through the bath and through the heat tubes into a sump area therebelow wherein the accumulated oil is of necessity at a lower temperature. As a result, disagreeable flavors from the overcooked food particles are allowed to penetrate the cooking oil bath and from there into the food being cooked.

In the event different food products are cooked in the same bath, the flavors commonly are interchanged. Finally, this design also is inherently inefficient because the oil in the sump typically is periodically drained, filtered and returned to the cooking bath. If the return oil is not re-heated, its injection into the bath will temporarily lower the bath temperature, and interfere with the cooking procedure. Therefore, a separate re-heater for the return oil is required.

In deep fat fryers, it is essential to maintain the optimum cooking temperature in the oil bath. This can be difficult when frozen food products are, for example, placed in a basket and submerged frozen in the bath. There is no way to avoid a downward fluctuation in the bath temperature in this event, and, the bath temperature must be returned to the optimum as quickly as possible. Food cooked at below optimum temperature will retain oil, become soggy, and generally not exhibit the desired crispness.

In U.S. Pat. No. 4,623,544, a weir is provided at the surface of the cooking bath and oil is continually allowed to flow over the weir and downwardly into a sump. The oil entering the sump is filtered by a cylindrical mesh filter, re-heated in a separate heat exchanger and continually re-injected into the oil bath. The oil bath itself is not exposed directly to heat tubes and the sump is physically separated from the oil bath.

The device described then while continuously filtering oil, tends to retain food particles in the bath because of the combination of the weir and downstream filter, and most importantly, is heat inefficient because of the exposed piping to and from the heat exchanger which is remote from the oil bath.

In U.S. Pat. No. 3,977,973, a heat tube is provided in the lower portion of the bath and oil is withdrawn from the lower portion of the bath whereupon it flows through filters and is then re-injected into the bath at the bottom portion adjacent to the heat tubes. While this device is capable of filtering on a continuous basis, the food particles to be removed from the bath must first settle through the bath and through the heat tubes before being withdrawn from the bath. There is therefor time while the settling occurs for the food particles to transmit undesired flavors into the bath. In addition because the heated oil is re-injected into the bottom of the tank containing the oil bath, there is the possibility that circulation within the bath will not be sufficient so that it can be easily maintained at a uniform temperature.

Similarly in U.S. Pat. No. 5,404,799, a filter mechanism is placed at the bottom of the tank containing the oil bath so that oil is continually removed from the oil bath through the filter.

While this is a continuous filtering system it does not provide for removal of food particles within the bath which have settled to the bottom thereof. Furthermore, while the filter can be removed to be cleaned, the bottom portion of the tank adjacent the filter and surrounding the same would have to separately cleaned manually.

Similar filtering systems are shown for example, in U.S. Pat. Nos. 4,768,426 and 4,962,698.

Accordingly there is a need for a continuous filter system which also can provide for rapid cleaning of the filter system and for efficient heating of the oil bath.

SUMMARY OF THE INVENTION

It has been discovered that a unique heat tube design can provide efficient heating on a continuous basis for the oil bath in a deep fat fryer. In the device of this invention, a "U" shaped heat tube is provided extending in cantilever fashion from a side of the fryer into the oil bath. The heat tube contains a baffle arrangement so that combustion gases from a burner at one end will travel in a spiraling stream through a first leg of the "U" shaped burner tube and around the end return portion without scorching the end portion, and through the second leg. The combustion gases then flow downwardly below the fryer tank into a plenum wherein additional baffles are provided to improve the heat transfer within the system.

Finally, the plenum exhausts into a flue. In one embodiment it is intended that a blower be operated on a continuous basis and that the burner is operable in at least two modes, a low fire mode and a high fire mode. The blower is preferably designed to also draw ambient air through the control box for the unit to cool the controls before expelling the air into the burner system as combustion air. It is further intended that the burner be operated in a low fire mode on a continuous basis until a thermostatic sensor calls for the high fire mode and at completion of the high fire mode that the burner will return to a low fire mode so that in a day's operation the burner will not normally have to be relighted. The blower also changes the air flow responsive to a change in burner mode so that the cooling effect through the control box will reflect the increased or decreased heat generated by the burner.

In an alternative embodiment the burner can be operated intermittantly. When sensors call for heat, the burner will fire in the low mode and then in the high mode until the heat requirement is met. The burner will then shut off until sensors again call for heat, meanwhile the blower operates continuously as described in the first embodiment.

The invention also includes a continuous filtering system including a sump which is disposed beside the fryer tank so that oil from the surface of the tank will continuously spill over the edge of the tank into the sump.

In a preferred embodiment, unique, filter bags are provided of cotton cellulose material in the sump so that as the oil falls by gravity through the sump, food particles will be retained within the filter bags. The lower portion of the sump then will accumulate oil which will be drawn off by a suction pump, and the then filtered oil returned to the tank to be injected into the bath by a jet tube disposed at the upper portion of the heat tubes and opposite the sump. This tube in effect causes a turbulence that sweeps debris from the tank bottom up to the surface and into the sump. It also assists in penetrating food to be cooked so that it cooks faster and more efficiently.

When the filter bags have filled with sediment, a vacuum gage and/or sensor in communication with the suction pump will provide a signal indicating the necessity to shut the system down and replace the filter bags. Merely suctioning the residual oil from the bags and lifting the bags from the sump and inserting new bags is normally all that is required before restarting the system.

In the preferred embodiment the filter used consists of filter bags of 100% virgin cotton unbleached, 9.7 oz. sateen weave, 96×60 (pic per inch), with an air permeability of 15–20 CFM. The sateen side is inside in the preferred embodiment.

Alternatively, the filter bag may be of metal, either a mesh type, perforated metal, or a porous metal of the sintered type.

Furthermore, paper or a cellulose paper with a synthetic mix may also be used and the synthetic constituent of the filter bags may be such materials as rayon, nylon, Teflon, polyester and the like. In addition, activated carbon or charcoal may be used or the filter media itself may be impregnated with diatomaceous earth or any other filter aide powder known to those skilled in the art. Finally, the filter bags may be pleated paper, synthetic or felt material or felt cloth or a ceramic material as will be obvious to those skilled in the art.

Accordingly, it is an object of this invention to provide a continuous filtering system for deep fat fryer which utilizes a sump disposed adjacent the fryer wherein surface oil continually is drawn into the sump and into a filter therein. The filter retains sediment from the oil, and the filtered oil is then drawn from the sump and recirculated into the deep fat fryer.

It is another object of this invention to provide a deep fat fryer with a highly efficient heating system for the oil bath which utilizes a "U" shaped heat tube extending through the bath with internal baffles to provide a spiraling circulation of combustion gases and a plenum disposed below the bath to heat the interior and lower portion of the bath on a continuous basis.

It is a further object of this invention to provide an efficient deep fat fryer which will both efficiently maintain an oil bath at a desired temperature, and continuously remove food products from the surface of the bath before the food products absorb sufficient oil to settle to the bottom so that the food particles are rapidly removed as they accumulate in the bath, minimizing the opportunity to impart undesirable flavors to the bath.

It is yet another object of this invention to provide unique filter bags for filtering hot cooking oil wherein the bags are of a porous material having an open top and opposed shoulder portions for receiving a metal clamp plate at the top thereof so that the bags can be lowered into a sump by the metal plate and raised from the sump by the same support, and whereby the bags may be disposed of merely by removing the metal support from the respective shoulder portions of each bag.

These and other objects will become readily apparent with reference to the drawings and following description wherein:

DETAILED DESCRIPTION OF THE DRAWINGS

FIG. 11 is a prospective view of a filter bag from the filter system of FIG. 10.

FIG. 12 is a prospective view of the metal support plate used in combination with the filter bag of FIG. 11.

FIG. 13 is a fragmentary assembled view of the filter bag and support plate of FIGS. 11 and 12; and FIG. 14 is a prospective view of hand held device to raise or lower the filter system from the sump in the device of this invention.

DETAILED DESCRIPTION OF THE INVENTION

Figure 1:
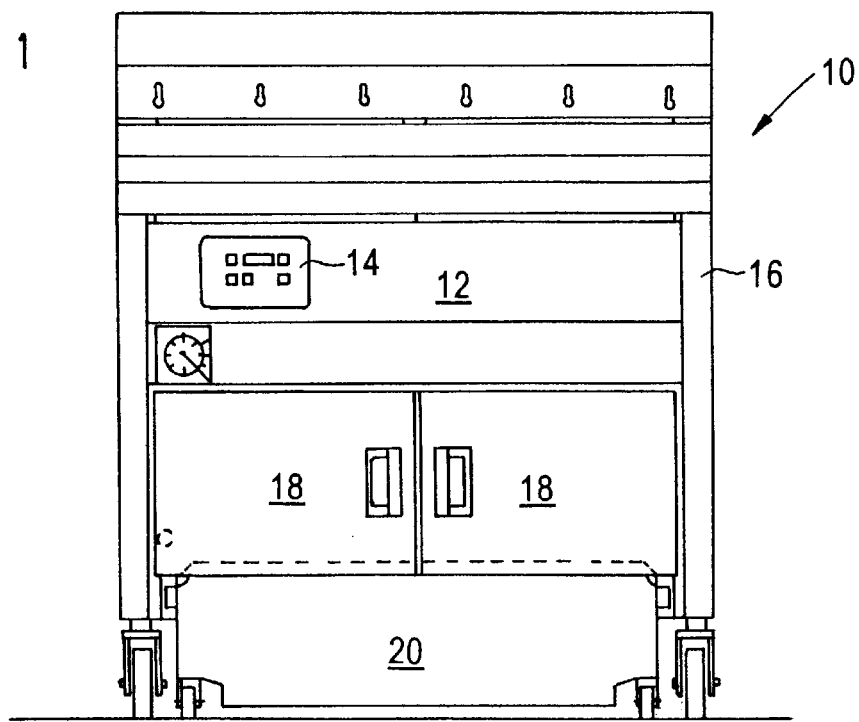
FIG. 1 is a front view of the deep fat fryer of this invention.
Figure 2:
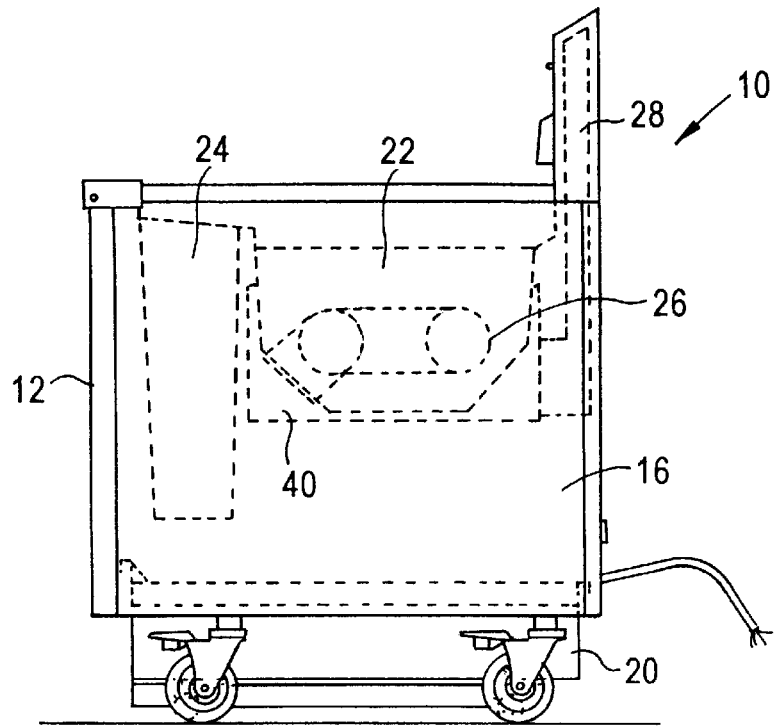
FIG. 2 is a side view of the deep fat fryer of this invention.

With attention to the drawings and to FIGS. 1 and 2 in particular, the deep fat fryer 10 of this invention includes a front portion 12 mounting controls 14 within a housing 16 having access doors 18 and having a wheeled oil container 20 disposed therebelow.

FIG. 2 is a right side view of the deep fat fryer 10 of this invention showing the housing 16, the wheeled hot oil container 20, and in phantom, the fryer tank 22, filter sump 24, burner tube 26 and an internal flue 28 which could be connected to an external flue (not shown).

Figure 3:
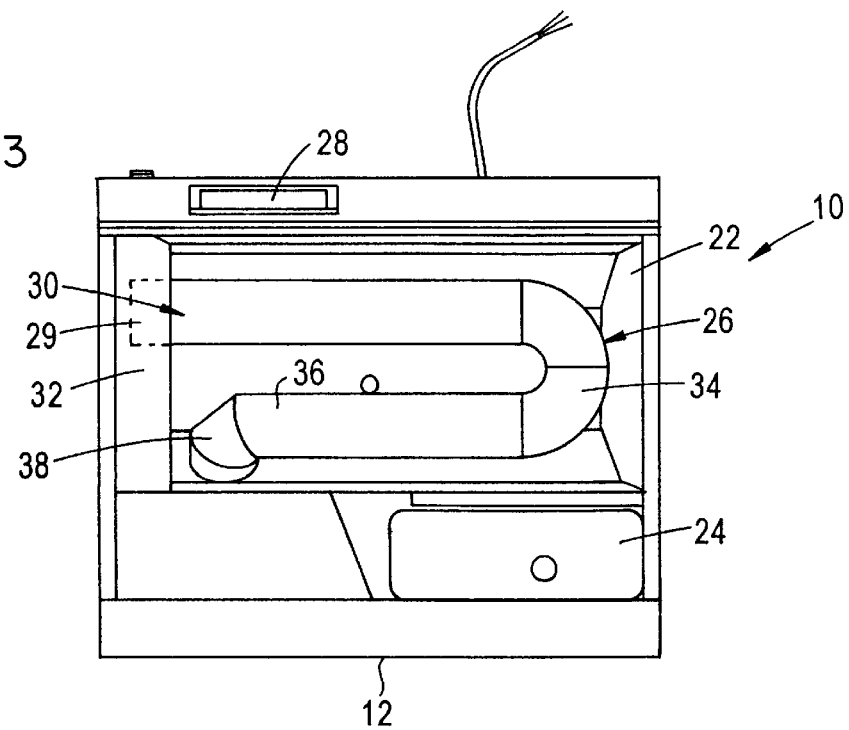
FIG. 3 is a top view of the deep fat fryer of this invention.
Figure 4:
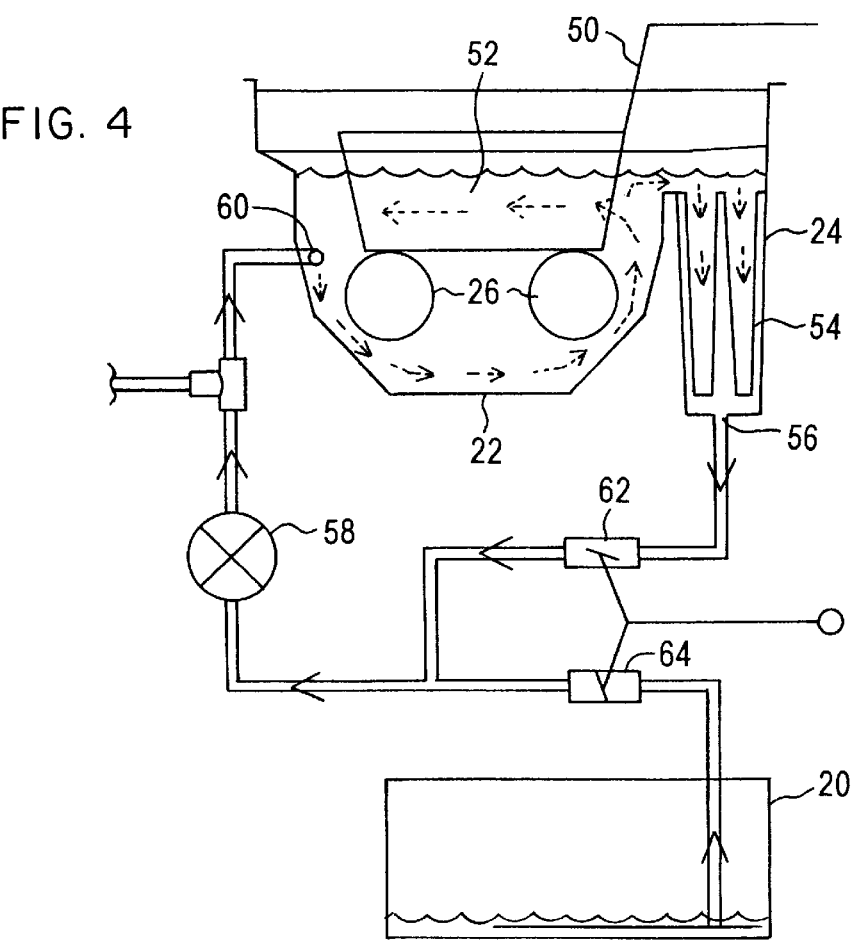
FIG. 4 is a schematic view showing oil circulation within the deep fat fryer of this invention.
Figure 5:
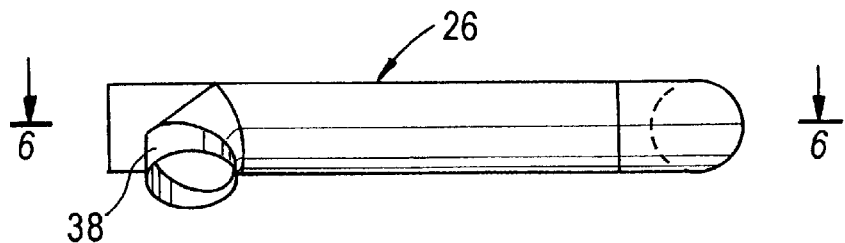
FIG. 5 is a side view of the heat tube used in the deep fat fryer of this invention.
Figure 6:
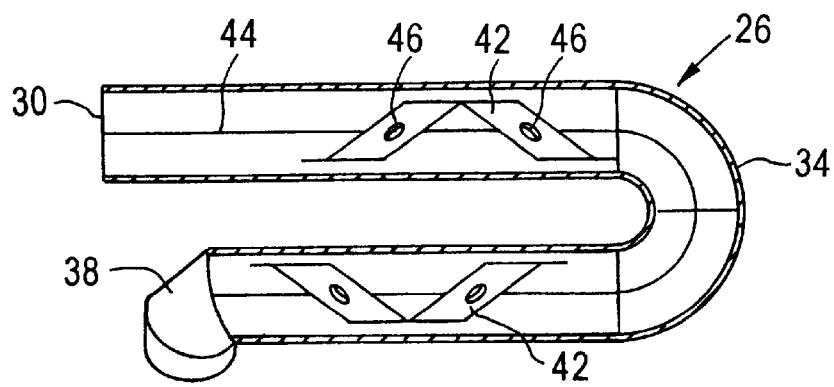
FIG. 6 is a cross-sectional view taken along lines 6 6 of FIG. 5.
Figure 7:
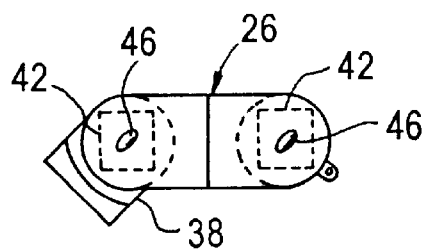
FIG. 7 is an end view of the heat tube of FIG. 5.
Figure 8:
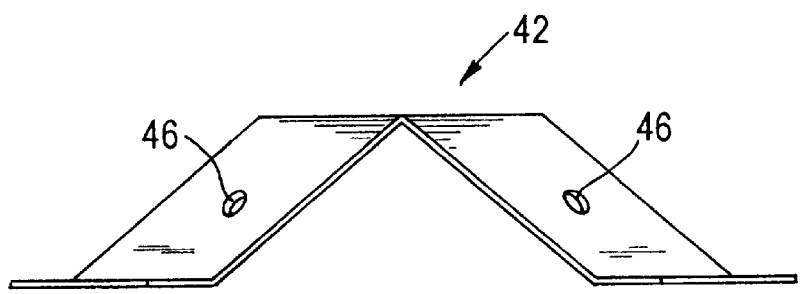
FIG. 8 is a top view of the baffle plates used in the heat tube of FIG. 5.

With reference to FIGS. 2, 3 and 4, the tank 22 mounts cantilever style the burner tube 26 which consists of a "U" shaped conduit having a conventional burner blower combination 29 mounted at an end 30. Burner tube 26 is also mounted cantilever fashion at end 30 to the left side wall 32 of the fryer tank 22. Combustion gases in burner tube 30 travel toward the return section 34 and then return along leg 36 to be expelled downwardly in elbow 38 to a plenum 40. The exhaust gases circulate through plenum 40 into a flue 28. As will be obvious to those skilled in the art, baffle plates (not shown) are disposed in plenum 40 to improve heat transfer between the hot combustion gases passing therethrough and the bottom of tank 22.

The burner tube 26 is mounted cantilever style from the left side wall 32 so that as the burner tube heats expansion will not effect the tube mounting.

With attention to FIGS. 5–8, the burner tube 26 is intended to convey the gases of combustion from the burner 29 in a spiraling fashion. It was discovered that when the combustion gases pass through the tube 26 in a spiraling fashion, excessive heat is not produced in the return section 34. In the conventional burner tube, wherein the return section is a substantially square corner, excessive heat is a problem and requires more expensive heat resistant construction materials. The spiraling effect of the gases passing through burner tube 26 is enhanced by baffle plates 42 disposed in the legs of burner tube 26. The baffle plates essentially are disposed at an acute angle to the axis 44 of the burner tube 26, and have central holes 46 therein to facilitate the passage of the combustion gases. The baffle plates 42 create a turbulator effect within the burner tube 26 whereby not only are the combustion gases swirled as they pass therethrough, but heat transfer therefrom is facilitated by conduction from the baffle plates 42 to the walls of the burner tube 26.

With reference to FIG. 4, during normal operation, food to be cooked is disposed in a basket 50 which is lowered into the tank 22. Hot oil 52 from within the tank continuously overflows into the sump 24 where it is filtered in a filter assembly 54.

A second filter (not shown) can be disposed at the outlet 56 of the sump 24 so that if an inexperienced operator permits food to fall into the sump, it will not circulate to the pump 58. A suction pump 58 normally returns the filtered oil to the tank 22 through a jet tube 60 disposed within the tank along a wall opposite the sump. Jet tube 60 is intended to be disposed adjacent the upper portion of the burner tube 26 to facilitate the circulation pattern shown in FIG. 4.

It has been discovered that this structure including the circulation pattern facilitates the rapid removal of dislodged pieces of food to be cooked from basket 50 into sump 24 so that they can be filtered from the system before undesirable flavors are imparted to the oil bath 52.

As also shown in FIG. 4, the conduit system for normal operation uses a valve system 62 and 64. Valve 64 is normally closed, but it can be opened if it is desired to use pump 58 to supply oil from the oil container 20. As will be obvious to those skilled in the art, conventional means can be used to drain the tank 22 into oil container 20 by gravity, or by a pump system (not shown).

Figure 9:
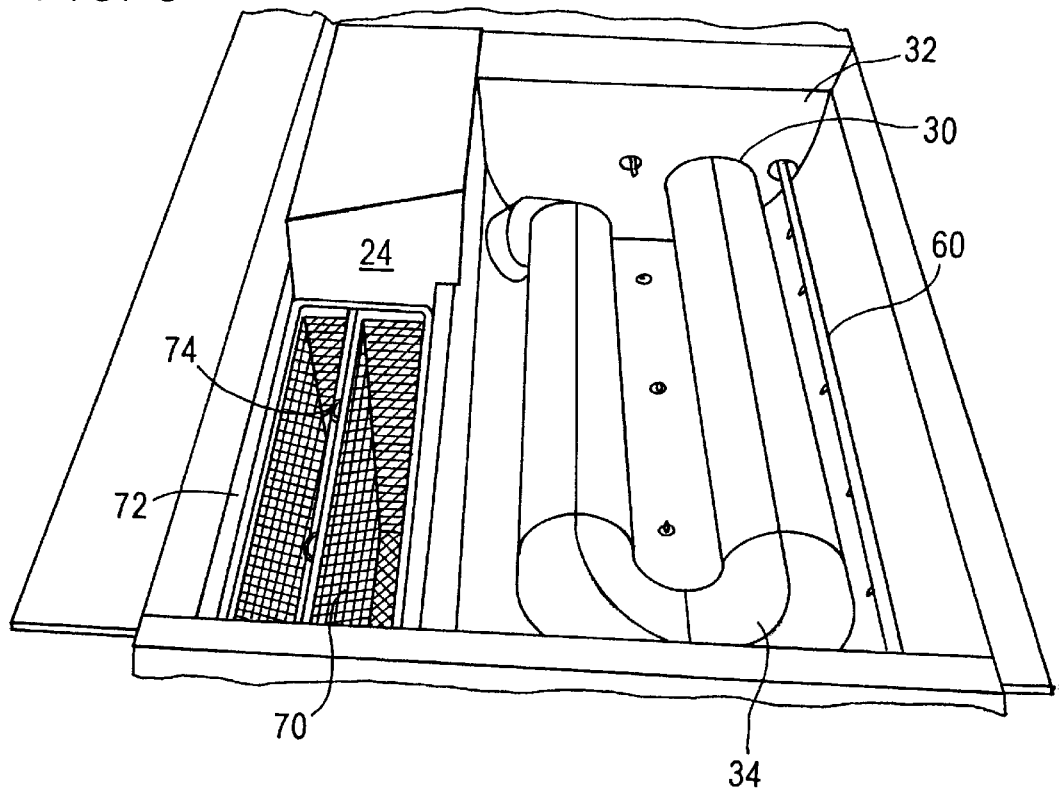
FIG. 9 is a fragmentary prospective view looking downwardly into the deep fat fryer of this invention.
Figure 10:
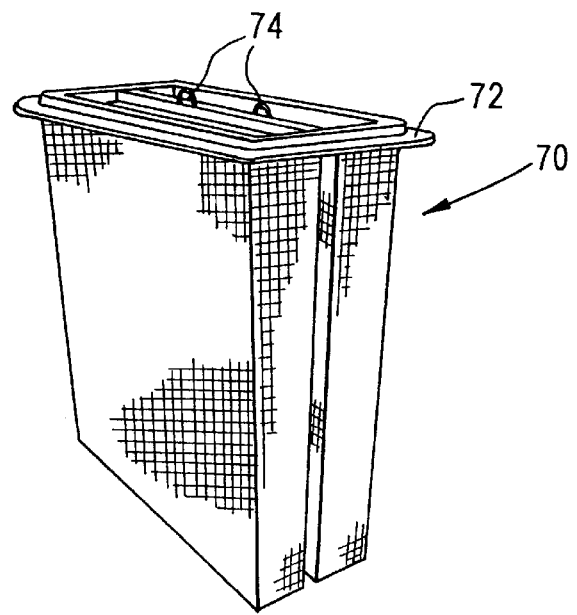
FIG. 10 is a prospective view of the sump filter system for the device of this invention.

Concerning the filter system, sump 24 preferably mounts a pair of mesh baskets 70 as shown in, for example, FIGS. 9 and 10.

Mesh baskets 70 typically are tapered inwardly toward the bottom and are held in place by a collar 72 which has a pair of eyes 74 to facilitate removal thereof from the sump 24 as will be subsequently explained.

With reference to FIGS. 11–13, each mesh basket 70 is intended to receive a cloth filter bag 80 supported by a metal clamp plate 82 which in turn mounts a pair of eyes 84. As shown in FIG. 13 each filter bag 80 is supported on clamp plate 82 by shoulders 86 integral with a bag 80 and an opening 88 is provided in plate 82 for oil to be filtered to be admitted to the interior of bag 80. The preferred embodiment of this invention shows a pair of mesh baskets 70 which would be intended to each receive a filter bag 82. Filter bags 82 are tapered towards the bottom 90 so that when suspended as shown in FIG. 13, they will easily fit within the basket 70 and because the bags 80 are cloth, they will be self aligning within the basket 70.

FIG. 14 shows a gripping member 94 which has a pair of hooks 96 and is intended to be gripped at the handle portion 98. Hooks 96 are intended to be received in eyes 84 so that the bag 80 can be raised and lowered by hand from basket 70. Similarly, hooks 96 can be received in eyes 74 so that the basket assembly 70 shown in FIG. 10 can be raised from the sump 24 for cleaning or the like.

While the preferred embodiment of the filter of this invention uses a pair of cloth bags, and the cloth is preferred to be a sateen weave 96×60 (pic per inch), of 100% virgin cotton, 9.7 oz., with the sateen side in and an air permeability of 15–20 CFM. Other types of materials can be used either disposable, re-usable, or re-usable for only a relatively small number of times. For example, the bags may be made of paper with or without a synthetic mix and the synthetic materials could be rayon, nylon, Teflon, polyester or the like. Furthermore, felt cloth, paper or screen and the like either of synthetic, or paper materials could be used and ceramic materials could be used. The media used in the filter could be impregnated with diatomaceous earth or other filtering products as desired. Finally, the filter could be a metal mesh perforated metal, or porous sintered type of metal instead of a disposable or re-usable cloth, paper, or the like.

In addition, in the preferred embodiment of this invention the shoulders 86 are provided to accept the ends of the clamp plate 82 to thereby support the filter bag. This invention, however, is not intended to be limited to that specific design and any conventional means for attaching the filters to a support so that the filter can be removed from the sump is intended to be included as part of this invention.

During operation, when the vacuum at the suction pump 58 reaches a predetermined point, a gauge and/or sensor (not shown) will activate a signal indicating to an operator that the system should be shut down and filter bags 80 replaced. In that event, the bags can be withdrawn with member 94 from the baskets 70, and disposed of.

New bags 80 can then be quickly mounted on clamp plate 82 and the composite returned to the basket assembly 70 so that the system can be restarted.

In summary, the efficient deep fat fryer system of this invention maximizes the heat exchange from a gas burner by using a cantilever mounted "U" shaped burner tube which extends through the tank of cooking oil. The burner is intended to admit products of combustion in a swirling fashion and the swirling fashion facilitated by baffle plates disposed within the "U" shaped burner tube. Because of this spiraling circulatory passage of gases through the tube, the return section at the end opposite the burner, does not need to be of extraordinary heat resistant material. Without the swirling effect of the products of combustion, the burner would admit a jet thereof directly against the return section wall, and that wall then would require heat resistant material to avoid deterioration and negatively affect oil life. The gases from the burner travel through the burner tube and exit therefrom into a plenum below the tank wherein further baffle plates may be used to facilitate heat exchange with the combustion gases before they are expelled from the plenum through a flue. The burner system of this invention is intended to operate on at least two different modes. A low fire mode is provided to reduce the component cyclical wear and for melting solid shortening.

A sensor control is also provided so that when the cooking oil in the tank reaches a predetermined temperature the burner will change to a high fire mode wherein both the burner and the blower associated therewith provide an enhanced heat exchange with the oil in the tank until it reaches a cooking temperature. The control system for this invention then contemplates a return to a low fire mode of operation so that the burner is continually on during the cooking process but cycles to a high fire mode when necessary due to temperature changes within the cooking oil. The control will activate the pump filter system automatically once a predetermined temperature is reached.

As an alternative the burner can operate intermittently wherein it fires each time sensors call for heat to the tank and once a flame is present the burner goes to the high fire mode for the duration of the burn.

The deep fat fryer of this invention further utilizes an improved filter circulatory system wherein a sump is provided adjacent the upper portion of the tank so that cooking oil continually overflows into the sump and it passes through filter bags to remove entrained sediment therein. The filtered cooking oil is then recirculated by a suction pump to a jet tube disposed opposite the sump on the side of the tank and the filtered cooking oil is injected into the tank.

It is intended that this filter system will operate to remove dislodged food particles primarily from the surface of the tank before they have sufficient time to absorb cooking oil and settle to the bottom thereof. By rapidly removing any food particles which dislodge from the food being cooked, the likelihood that such particles will impart undesirable flavors to the cooking oil is minimized.

The preferred filter bags of this invention are intended to be of 100% virgin cotton cellulose material (unbleached) and are intended to be re-usable or disposable. Each bag is tapered downwardly to facilitate raising and lowering it from its supporting basket, and each bag has a corresponding shoulder thereon at the top for engagement with a flat support plate of metal. The metal plate then would be reusable whereas the bags would be discarded when they are filled with sediment.

To facilitate efficient filtering the bag must preferably be 9.7 oz. sateen weave, 96×60 (pic per inch) with air permeability of 15–20 CFM. It was found to be desirable for efficient filtering that the sateen side of the bag is inside.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein.

It is therefor intended that the protection granted hereon be limited only by the definition contained in the appended claims and equivalents thereof.

What is claimed is:

1. A deep fat fryer comprising:

a housing having a front, sides and back, an upwardly opening tank for holding cooking oil disposed within said housing and having sides and a bottom, an upwardly opening sump having sides and a bottom, disposed within said adjacent tank, and means for directing oil, overflowing said tank from the opening thereof, into said sump;

a U-shaped burner tube having first and second legs extending across said tank, and attached by an end of a first leg to a side of said tank, burner means mounted in said housing and communicating with the interior of said tube through the end mounted on the side of said tank for directing products of combustion therethrough, means carried by said burner tube for circulating said products of combustion through said tube in a spiral path from the burner, successively through the first and second legs of said tube;

filter means removably mounted in said sump for filtering oil overflowing from said tank thereinto; and circulating means for continuously withdrawing filtered oil from said sump and re-injecting said oil into said tank.

2. The fryer of claim 1 further comprising a jet tube extending across an interior side of said tank opposite said sump adjacent the upper portion of said tube, said jet tube coupled to said circulating means and adapted to inject filtered oil into said tank.

3. The fryer of claim 2 further comprising means carried by said tank for, in conjunction with said jet tube, circulating oil within said tank to continually sweep debris from the tank bottom and to the surface of the tank.

4. The fryer of claim 1 wherein the bottom of said tank defines a port and the second leg of said tube terminates in a downwardly directed elbow extending through said port and adapted to expell circulated combustion gases therefrom.

5. The fryer of claim 4 wherein an exhaust plenum is provided within said housing surrounding the bottom of said tank said plenum being in communication with said tube through the tank port; and flue means mounted on said housing in communication with said plenum for expelling circulated combustion products therefrom.

6. The fryer of claim 1 wherein said circulating means within said burner tube includes a pair of baffle plates mounted in each leg thereof, disposed at an acute angle to the longitudinal axis of said tube leg, each plate having a central opening therethrough, said plates being in a heat exchange relationship with the combustion gases passing through said tube.

7. The fryer of claim 1 wherein said sump is disposed abutting a side of said tank and said means for directing overflow oil from said tank to said sump includes a gutter extending between an edge of the tank opening and an edge of the sump opening.

8. The fryer of claim 7 wherein said sump further comprises at least one mesh basket received therein, said basket opening upwardly and normally aligned with the sump opening and abutting the sides thereof said basket being removable from said sump through its opening.

9. The fryer of claim 8 wherein said filter means includes at least one upwardly opening porous, bag adapted to be suspended within said basket.

10. The fryer of claim 9 wherein said filter means includes a plate adapted to be removably attached to said bag at the opening thereof and dimensioned to engage at least a pair of sides of said basket to support the bag suspended therein.

11. The fryer of claim 10 wherein said basket includes a flange surrounding the opening and extending outwardly therefrom, said flange dimension to engage the sides of said sump so that oil entering the sump will pass through the opening of said basket.

12. The fryer of claim 11 wherein said plate defines a central opening therethrough and is dimensioned to engage the flange on said basket opening so that oil entering the sump will pass through the opening in said plate, into said bag, therethrough into said basket, and therethrough into said sump.

13. The fryer of claim 12 wherein a pair of baskets and a pair of filters therefor are provided.

14. The fryer of claim 12 further comprising means for removing said plate and suspended bag from said basket carried by said plate.

15. The fryer of claim 12 further comprising means for removing said basket from said sump, carried by said basket.

16. The fryer of claim 10 wherein said bag defines a rectangular upper opening and depending sides, said sides tapering inwardly to a bottom, the opening having opposed shoulders extending inwardly from opposed sides, said shoulders adapted to removably engage opposite ends of said plate.

17. The fryer of claim 16 wherein said bag is rectangular in cross-section and the opening therein is defined by said opposed shoulders and portions of edges a pair of opposed sides.

18. The fryer of claim 9 wherein said bag is comprised of cloth which is 100% virgin cotton, unbleached, 9.7 oz., sateen weave 96×60 (pic per inch) with air permeability of 15–20 CFM, sateen side inward.

* * * * *